March 15, 1960     J. R. PARSONS     2,929,011
THREE-PHASE CONTROL
Original Filed April 15, 1949     3 Sheets-Sheet 1

INVENTOR
John R. Parsons.
BY
ATTORNEY

INVENTOR
John R. Parsons.
BY
ATTORNEY

United States Patent Office 2,929,011
Patented Mar. 15, 1960

2,929,011

THREE-PHASE CONTROL

John R. Parsons, Pennsauken, N.J., assignor to Westinghouse Electric Corporation, a corporation of Pennsylvania Original application April 15, 1949, Serial No. 87,714, now Patent No. 2,683,851, dated July 13, 1954. Divided and this application October 7, 1953, Serial No. 384,703

8 Claims. (Cl. 321—7)

This application is a division of my Patent No. 2,683,851 for Three-Phase Control issued July 13, 1954, and assigned to Westinghouse Electric Corporation.

My invention disclosed in this application relates to electric discharge apparatus and it has particular relation to resistance welding apparatus. The invention is an outgrowth of my experience with low frequency welding apparatus of the type disclosed in the following applications, all of which are assigned to Westinghouse Electric Corporation:

| Patent No. | Inventor | Issue Date |
| --- | --- | --- |
| 2,508,467 | E. C. Hartwig and J. R. Parsons | May 23, 1950. |
| 2,510,652 | C. B. Stadum and J. R. Parsons | June 6, 1950. |
| 2,619,591 | J. R. Parsons | Nov. 25, 1952. |
| 2,640,180 | J. R. Parsons | May 26, 1953. |

The above-listed applications relate to welding systems in which power is derived from an alternating current commercial supply and supplied to a load such as a welding transformer at a substantially lower frequency than that of the supply. The supply may be of the single-phase or polyphase type. The conversion from the commercial frequency to the lower frequency is effected by operation of electric discharge valves, usually ignitrons, interposed between the supply buses and the primary of the welding transformer. Preferably, the ignitrons are subdivided into pairs, each pair being connected in antiparallel to a section of the primary of the welding transformer and each section and its associated pairs being connected across a pair of buses of the supply. The individual ignitrons of the pairs are so controlled that first current of one polarity is built up in the welding transformer and permitted to decay, and immediately thereafter current of the opposite polarity is built up and permitted to decay. The ignitrons of each pair which conduct the current of each polarity I will designate a group. In the systems shown in Patent Nos. 2,640,180 and 2,508,467 there are three ignitrons in each group. In the system shown in Patent 2,510,652 there are two ignitrons in each group.

In operating apparatus of this type, I have found that it is on the whole satisfactory. I have, however, encountered situations in which certain of the ignitrons have a relatively short life in operation. In such situations the ignitrons are severely damaged after the apparatus is operated for only a short time; sometimes the damage is so severe that the ignitrons must be replaced. In addition the load may also be damaged. In particular, I have found that such difficulties arise when the apparatus is operated with a load having a low power factor such as arises when the welding electrodes are short-circuited for test purposes.

It is, accordingly, an object of my invention to provide a low frequency welding system of the electronic type in which the electric discharge valves conducting the load current shall operate without becoming seriously impaired in a short time.

Another object of my invention is to provide welding apparatus including electric discharge valves through which the load current is supplied which shall operate at a low power factor, such as is encountered when the welding electrodes are short-circuited, without serious impairment to the discharge valves.

Still another object of my invention is to provide an electronic control system for converting power derived from a commercial supply to a substantially lower frequency to be supplied to a load such as a welding transformer which shall operate over long periods of time without serious impairment to the electric discharge valves which conduct the load current.

A further object of my invention is to provide an electronic converter for deriving power from an alternating supply at a substantially lower frequency than that of the supply which shall operate to supply loads having power factors of the order of 20% without serious damage to the electric discharge valves which carry the load current.

A still further object of my invention is to provide an electronic converter for deriving power from an alternating supply at a substantially lower frequency than that of the supply which shall operate without damage to the load.

An ancillary object of my invention is to provide a novel control circuit for controlling the firing of the main discharge valves in systems such as are shown in the above-listed patents.

Still another ancillary object of my invention is to provide a converter of the type disclosed in the above-entitled patents, Nos. 2,640,180; 2,619,591 and 2,508,467, which shall include a substantially smaller number of main valves and control circuits for main valves than do the corresponding systems disclosed in the above-mentioned three patents and shall, for many purposes, afford as satisfactory service as the apparatus disclosed in said three patents.

My invention arises from the realization that one of the ignitrons of each of the groups of ignitrons included in the systems disclosed in the above-listed patents, fails to become extinguished at the end of its conductive period and continues to conduct for time intervals of substantial duration. It is these ignitrons which are damaged.

In operation of the systems disclosed in the above-listed patents, one ignitron of each pair of antiparallel connected ignitrons, that is of each group, is rendered conductive when the bus to which its anode is connected becomes positive relative to the other buses, and conducts in its turn during a low frequency half period until the current built up in the load has the desired low frequency amplitude. The last ignitron of the group to conduct carries the maximum current. When this current is reached, the first ignitron of the conducting group is not again fired. As the current decays in the load, the last ignitron of the group continues to conduct. The current during the low frequency half period of the opposite polarity is now to be conducted by the other ignitrons of each pair. Each of the latter is rendered conductive in its turn, as the bus to which its anode is connected becomes more positive than the other buses of the supply. I have found that the damage to the ignitrons arises from the fact that when the first of the ignitrons which conducts the current of the reverse polarity is rendered conductive, the last of the ignitrons which conducts the current of the initial polarity is still conductive. The current conducted by the first ignitron to conduct the reverse current induces potential in the winding supplied from the last ignitron to conduct the current of the initial polarity in such a sense as to build up the decaying conductivity of this last ignitron. The latter, therefore, conducts for an excessively long interval. In addition the current supplied to its corresponding winding through the first ignitron of the new group is returned to the supply through the last ignitron of the old group. A short circuit is thus in effect produced. Because the last ignitron of the old group conducts for an excessively long interval under short circuit conditions it soon becomes hot, fails to deionize and carries current of both polarities continuously. The same condition arises as the last ignitron to conduct the reverse current continues conductive after the first ignitron to conduct the current of the initial polarity is rendered conductive during the succeeding low frequency half period. This phenomenon is more common at low power factors than at high power factors, and is particularly marked when the apparatus is operated with the welding electrodes short-circuited for test purposes.

In accordance with my invention, I provide a system in which the load is supplied from less than all of the phases of a polyphase supply. For example, the load may be supplied from only two phases of a three-phase supply. Under such conditions, the current in the load is built up in such manner that the excessive conductivity by certain valves described above is also avoided.

The novel features that I consider characteristic of my invention are set forth with particularity in the appended claims. The invention itself, however, both as to its organization and its method of operation, together with additional objects and advantages thereof, will be understood from the following description of a specific embodiment when read in connection with the accompanying drawings, in which:

Figure 4:
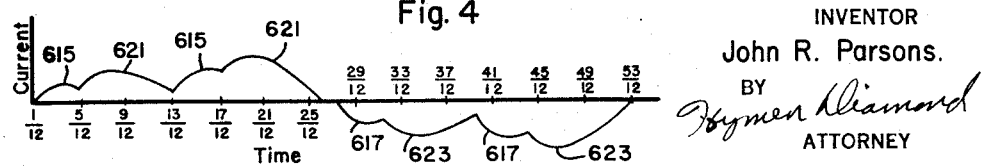
Figure 3:
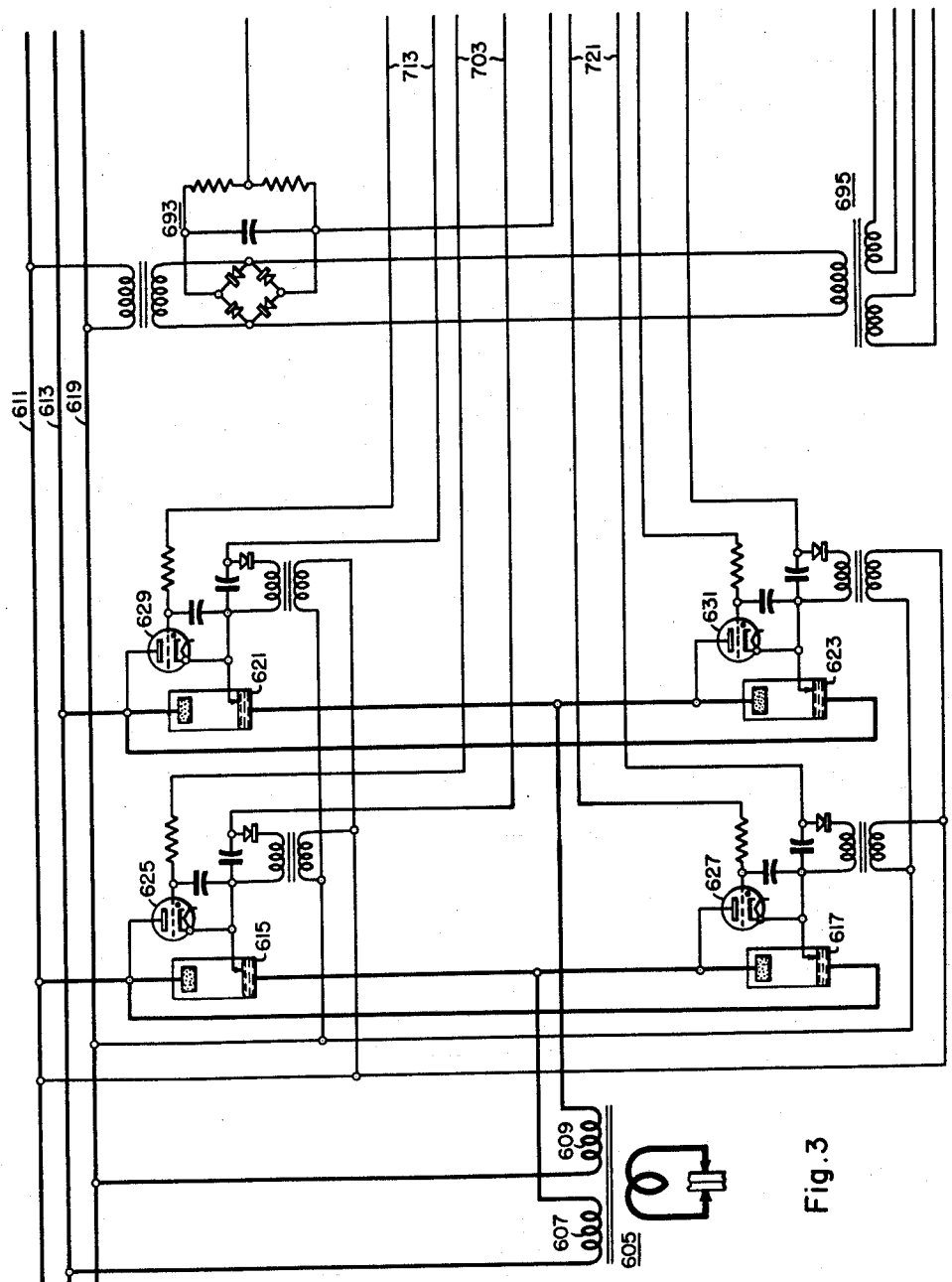
Figure 3A:
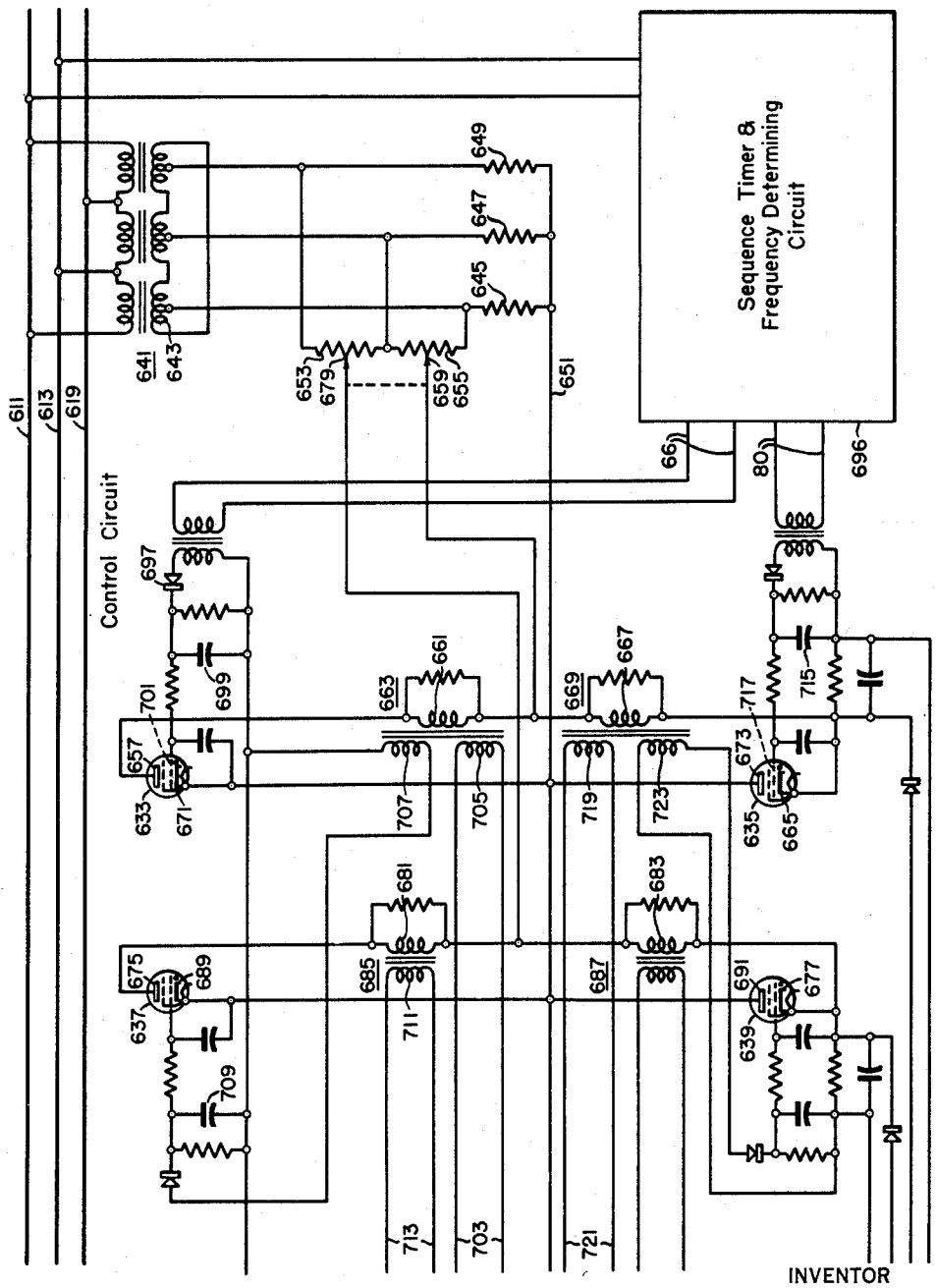

Figs. 3 and 3A together constitute a circuit diagram of a still further modification; and Fig. 4 is a graph illustrating the operation of the apparatus shown in Figs. 3 and 3A.

Figure 1:
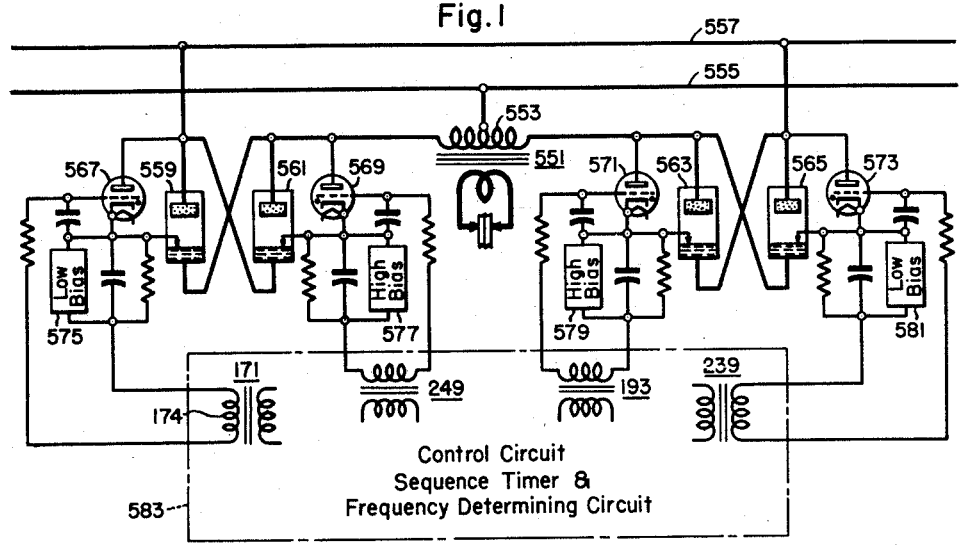
Fig. 1 is a circuit diagram of one embodiment of my invention.

In the apparatus shown in Fig. 1, power derived from a single-phase source of commercial frequency is supplied to a load of substantially smaller frequency. This system includes a welding transformer 551 having a primary 553 provided with an intermediate tap. This tap is connected to one bus 555 of the supply. The terminals of the primary 553 are each connected to another bus 557 of the supply through a pair of ignitrons 559 and 561, and 563 and 565 in anti-parallel. Each ignitron is fired from a thyratron 567, 569, 571 and 573, respectively.

When the apparatus is in the quiescent state, the thyratrons 567 to 573 are maintained non-conductive by bias 575, 577, 579, 581 impressed in the control circuit of each respectively. The bias 575 and 581 impressed in the control circuit of one of the thyratrons 567 and 573, respectively, of each pair is substantially lower than the bias 577 and 579 impressed in the control circuit of the other thyratrons 569 and 571, respectively.

The thyratrons are controlled from a Control Circuit and Frequency Determining Circuit and Sequence Timer 583 of the type shown in Patent No. 2,510,652. The transformers of the system shown in Fig. 1 which are identified by the numerals 171, 193, 239 and 249 are identical to the same numbered transformers of the system shown in Figs. 1 and 2 of Patent No. 2,510,652.

The operation of the Control Circuit, Frequency Determining Circuit and Sequence Timer 583 is identical to that of the same circuit shown in Patent No. 2,510,652. This operation is illustrated in Fig. 3 of that patent. Pulses are supplied during a predetermined number of successive half periods of the supply alternately through transformer 171 and transformer 193. These pulses are impressed in the control circuits of the thyratrons 559 and 563 displaced in phase with reference to the potential supplied from the buses 555 and 557. In Fig. 3 of the patent this phase displacement is illustrated as of the order of 90°. The phasing is such that when any pulse is impressed the bus to which the anode of the associated ignitron is connected is positive relative to the other bus. During a succeeding number of half periods of the supply, similar pulses are supplied alternately through transformers 239 and 249. The pulses supplied through transformers 171, 193, 239 and 249 may be of approximately sine wave form. The amplitude of each of the pulses is sufficient to counteract the bias 575 to 581. However, the low biases 575 and 581 are counteracted earlier in the half periods of the supply than the high biases 577 and 579.

When a pulse is impressed through the transformer 171, the associated firing thyratron 567 is rendered conductive early in the half period of the supply 555, 557. The corresponding ignitron 559 is then fired and current is conducted from the upper bus 557 through the ignitron, the left-hand portion of the primary 553 to the other bus 555. During the succeeding half period of the supply, a pulse is supplied through the transformer 193. The associated thyratron 571 and its ignitron 563 are now fired substantially later in the half period of the supply, current is conducted from the lower bus 555 through the right-hand portion of the primary 553, the ignitron to the upper bus 557. Because the firing of the second ignitron is delayed, the current in the transformer 551 built up through the first ignitron is permitted to decay somewhat. Another pulse is now supplied through the transformer 171 and the first ignitron 559 is again rendered conductive early in its half period of the supply. Current again flows through the left-hand portion of the primary 553. Thereafter, a pulse is supplied through the transformer 193 and the second ignitron 563 is again rendered conductive later in its positive half period of the supply. A second current pulse now flows through this ignitron 563 and through the right-hand portion of the primary 553. The alternate supply of pulses through the transformers 171 and 239 may continue in this manner until a low frequency half wave of the desired duration is supplied through the transformers 551. For the purpose of the present explanation, we may assume that each half period of the low frequency is made up of four half periods of the supply frequency 555, 557 accordingly that only two pulses are supplied through each of the transformers 171 and 193.

Pulses are now supplied through the transformers 239 and 249 in the control circuits of the associated firing thyratrons. The first pulse supplied through the transformer 239 renders the associated firing thyratron 573 conductive early in its positive half period of the supply and current flows through the ignitron 565. The ignitron 565 is fired at an instant in the half period of the high frequency supply determined by the phase of the pulse supplied from the transformer 239. This instant may be approximately ¼ of the supply period after the zero instant as illustrated in Fig. 3 of Patent No. 2,510,652. At this time the second ignitron 563 of the first group has been conductive for approximately one supply period and the current flow through it has been interrupted. Current now flows from the upper bus 557 through the conductive ignitron 565, the right-hand portion of the primary 553 to the lower bus 555. During the next half period of the supply, potential is impressed through the transformer 249 in the control circuit of the other firing thyratron 569. Because of the high bias 577, this thyratron is now rendered conductive later in its positive half period than the first thyratron firing the other ignitron 561. Current now flows from the bus 555 through the left-hand portion of the primary 553, the ignitron to the upper bus 557. Because of the delay in firing of the second ignitron, the current flow through the welding transformer 551 decays somewhat before it is further built up by the current flow through the second ignitron. Another pulse is now supplied through the transformer 239 and the first ignitron 565 is rendered conductive earlier in its half period than the second ignitron conducting current through the right-hand portion of the primary 553. A fourth pulse is now supplied through the transformer 249 and current is again conducted through the left-hand portion of the primary 553 and the second ignitron 561. Thereafter, in dependence upon the setting of the sequence timer, the above-described process may be repeated.

During the above-described process, current is supplied first from left to right through the portions of the primary 553 for four half periods of the supply and then from right to left through the primary during four succeeding half periods. In each case, the current flow through the last conductive ignitron 563 or 561 is interrupted before the current flow through the first tube of the second group is initiated. This interruption is effected by the delay in firing the second ignitron in each case.

Figure 2:
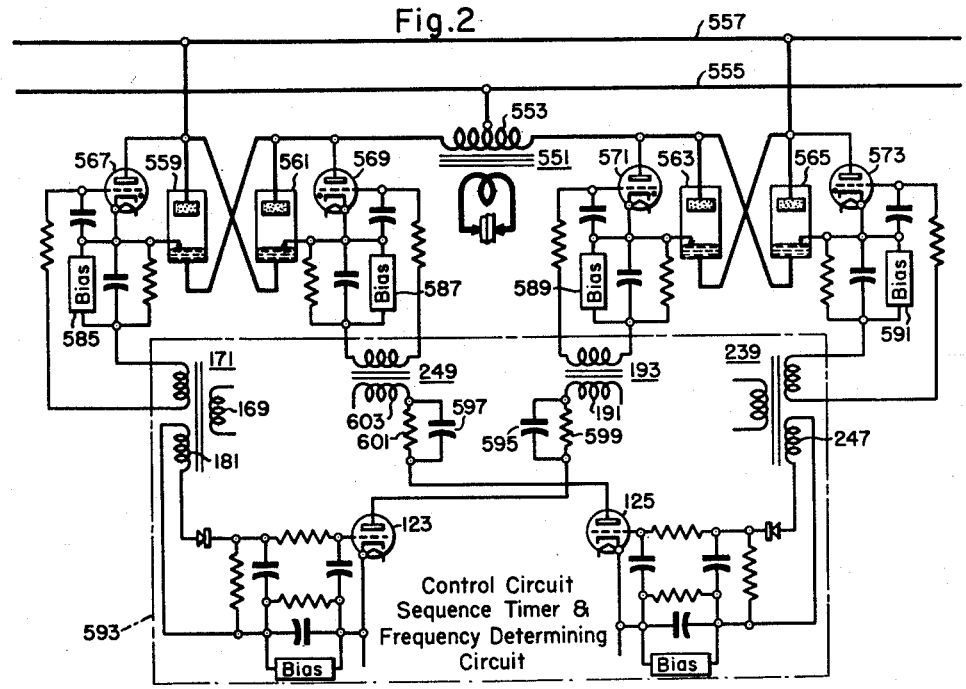
Fig. 2 is a circuit diagram of a modification of my invention.

The apparatus shown in Fig. 2 is similar to the apparatus shown in Fig. 1. However, in the system shown in Fig. 2 the biases 585, 587, 589 and 591 in the control circuits of the thyratrons 567 to 573 are alike. The latter thyratrons are controlled from a Control Circuit, Frequency Determining Circuit and Sequence Timer 593 similar to that shown in Patent No. 2,510,652 except for the anode circuits of the thyratrons 23 and 25 which are identical to the like numbered thyratrons of the system shown in Patent No. 2,510,652. In the anode circuits of the thyratrons 123 and 125 (identical to the thyratrons 23 and 25 of Patent No. 2,510,652) of the system shown in Fig. 2, networks are connected, each consisting of a capacitor 595 and 597 shunted by a resistor 599 and 601, respectively. These networks 595, 599; 597, 601 are in series with the primaries 191 and 603 of the transformers 193 and 249, respectively.

In the same manner as in the Fig. 1 system, a pulse is supplied first through the transformer 171 to render the first ignitron 559 conductive early in its positive half period. Current is conducted through the left-hand portion of the primary 553. The thyratron 123 connected to the primary 191 of the transformer 193 is now rendered conductive, a pulse is supplied through this transformer 193, the second ignitron 563 is fired early in its half period and current flows through the right-hand portion of the primary. At the same time, the capacitor 595 in the anode circuit of the thyratron 123 is charged. This capacitor discharges slowly through its shunting resistor 599. A second pulse is now impressed through the transformer 171 and the first ignitron 559 is again fired conducting current through the left-hand portion of the primary. Potential is now again impressed to fire the thyratron 123 from the secondary winding 181 of the transformer 171, but because of the counter-potential on the capacitor 595, this thyratron is fired substantially later in its positive half period than the first time. The associated ignitron 563 is fired correspondingly later and the current flow through the primary decays somewhat before it is further built up by the flow through the latter ignitron.

Potential is now impressed through the transformer 239 to fire the first ignitron 565 of the second group. Because of the delay in the firing of the second ignitron 563 of the first group, the current flow through the latter is interrupted before the first ignitron 565 of the second group fires. The second ignitron 561 of the second group is now fired during the subsequent half period of the supply as early in its positive half period as the first ignitron 565. The charge on the capacitor 597 in the anode circuit of the second thyratron 25 in now built up. The first ignitron 565 of the second group is now fired for the second time and, thereafter, the second ignitron 561 is fired. But because of the charge on the capacitor 597, the latter ignitron 561 is fired substantially later in its half period than it was the first time so that the current in the transformer 551 now decays somewhat before it is further built up by the current flow through the ignitron. The above-described process may be repeated in accordance with the requirements of the material to be welded and the setting of the sequence timing. During each repetition, the second ignitron 563 or 561 of the last conducting group becomes non-conductive before the first ignitron of the newly conducting group fires.

In the apparatus shown in Figs. 3 and 3A, power derived from a polyphase commercial source is supplied to a welding transformer 605 at a substantially lower frequency than that of the source. The transformer 605 includes a pair of primary windings 607 and 609; the first 607 connected between the upper bus 611 of the supply and the center bus 613 through a pair of ignitrons 615 and 617 in anti-parallel; the second 609 connected between the center bus 613 and the lower bus 619 through a second pair of ignitrons 621 and 623 in anti-parallel. With each of these ignitrons 615, 617, 621, 623 a firing thyratron 625, 627, 629 and 631, respectively, is associated. The firing thyratrons 625 to 631 are biased to non-conductivity and in the quiescent state of the apparatus, the ignitrons 615, 617, 621, 623 are non-conductive.

The firing thyratrons are controlled from a Control Circuit including four thyratrons 633, 635, 637, 639, each associated with one of the firing thyratrons 625 to 631, respectively. The Control Circuit is supplied from the secondary winding 643 of the delta transformer 641 energized from the main buses 611, 613, 619. The center taps of the windings of this secondary are connected together, each through a resistor 645, 647, 649, respectively. The common junction of the resistors constitutes a neutral bus 651 for the Control Circuit. The center tap of one winding of the secondary 643 is connected to the common junction of a pair of rheostats 653 and 655. The remaining terminals of the rheostats are connected to the other center taps. The anode 657 of the control thyratron 633 associated with one ignitron 615 is connected to the adjustable tap 659 of one rheostatt 655 through the primary 661 of a transformer 663. The cathode 665 of a control thyratron 635 associated with the anti-parallel connected ignitron 617 is connected to the same tap 659 through the primary 667 of another transformer 669. The cathode 671 of the former thyratron 633 and the anode 673 of the latter 635 are connected to the neutral bus 651. The anode 675 and cathode 677 of thyratrons 637 and 639, respectively, associated with the other ignitrons 621 and 623 are connected to the adjustable tap 679 of the other rheostat through the primaries 681 and 683, respectively, of another pair of transformers 685 and 687, respectively. The cathode 689 and anode 691 of these thyratrons 637 and 639, respectively, are connected to the neutral bus 651. A common bias 693 is connected in the control circuits of the two control thyratrons 633 and 637. The other two control thyratrons 637 and 639 are provided in their control circuit with separate biasing potentials from a transformer 695 having a single primary and a pair of secondaries. The bias impressed in the control circuit of each of the control thyratrons 633 to 639 is sufficient to maintain the control thyratrons non-conductive in the quiescent state of the apparatus.

The conductivity of the control thyratrons is controlled from a Sequence Timer and Frequency Determining Circuit 696 of the type shown in Fig. 3 of Patent No. 2,619,591. The pairs of conductors identified by the numbers 66 and 80 in Fig. 3A of the present application are identical to the conductors identified by the numerals 66 and 80 in Fig. 3 of the Patent No. 2,619,591.

In the operation of the apparatus, pulses are supplied first through the pair of conductors 66 at the beginnings of a predetermined number of successive periods of supply and then through the conductors 80 at the beginnings of a succeeding number of successive periods of the supply. A pulse derived from the conductor 66 is impressed through a rectifier 697 across a capacitor 699 connected between the control electrode 701 of the first control thyratron 633 and the bias 693. This capacitor 699 is charged in such a sense as to counteract the bias 701. At an instant predetermined by the setting of the associated rheostat 655, the thyratron 633 is rendered conductive and current flows through the primary 661 of the associated transformer 663. Firing potential is now impressed through conductors 703 from a secondary winding 705 of this transformer in the control circuit of the firing thyratron 625 for the first ignitron 615. The rheostat 655 is so set that this potential is impressed at the instant when the bus 611 connected to the anode of the ignitron 615 becomes positive relative to the other buses. This ignitron, therefore, conducts current through its associated primary 607 of the welding transformer 605.

From a second winding 707 of the control transformer 663, potential is impressed across a capacitor 709 connected in the control circuit of the second thyratron 637 in the same manner as the capacitor 699 is connected in the control circuit of the first thyratron 633. At an instant predetermined by the setting of the associated rheostat 653, the second thyratron 637 is now rendered conductive conducting current through its associated control transformer 685. From the secondary 711 of this transformer 685 through conductors 713, the associated firing thyratron 629 is rendered conductive. This thyratron is rendered conductive at the instant when the bus 613 connected to the anode of its ignitron 621 becomes positive relative to the other buses. Current is now conducted through the second winding 609 of the welding transformer. This current continues to flow for a substantially longer time interval than the current through the first primary 607 and the current built up in the welding transformer 605 by the conduction of the two ignitrons 615 and 621 decays somewhat. At the beginning of the succeeding period of the supply, a second pulse is supplied through the conductors 66. The first thyratron 633 is again rendered conductive firing the first ignitron 615. Again current is transmitted through the first primary 607. When the bus 613 connected to the anode of the second igniton 621 again becomes more positive than the other buses, the second ignitron 621 is again rendered conductive and current flows through its associated winding 609.

If the sequence timer (696) is properly set, another pulse may be transmitted through the conductors 66 at the beginning of a further period of the supply. However, for the purpose of the present explanation, we may assume that only two pulses are transmitted through conductors 66 and, thereafter, two pulses are transmitted through the conductors 80 at the beginning of subsequent period of the supply. The first pulse is transmitted through conductors 80 a short time before the instant when the bus 613 to which the anode of the first thyratron 617 of the second group is connected becomes positive relative to the other buses 611 and 619. The latter instant is approximately one period of the supply after the second ignitron 621 of the first group was rendered conductive. During this time, the current flow through the welding transformer 605 decayed, and the latter ignitron 621 became non-conductive.

The pulse transmitted through the conductors 80 is impressed on a capacitor 715 connected between the control electrode 717 and the cathode 665 of the first thyratron 635 of the second group through the bias 693 charging the latter to a potential such that the bias is counteracted. This thyratron 635 is now rendered conductive transmitting current through the primary 667 of its associated control transformer 669. From one secondary winding 719 of this transformer through conductors 721, the firing thyratron 627 associated with the ignitron 617 of the second group is rendered conductive. This ignitron now conducts and current of a polarity opposite to the polarity of the current which has been flowing is transmitted through the first primary 607. Through a second winding 723 of the control transformer 669, a potential is impressed to counteract the bias in the control circuit of the second control thyratron 639 of the second group. At an instant predetermined by the setting of its associated rheostat 653, this thyratron now becomes conductive rendering the associated firing thyratron 631 and its ignitron 623 conductive. Current now flows through the second primary 609. The current flow through this primary continues until the beginning of the succeeding period of the supply when a second pulse is transmitted through the conductors 80. The second period of the supply begins approximately $8/12$ of the period of the supply after the second ignitron 623 was rendered conductive. The current flow through the transformer 605 therefore decays somewhat before the second pulse is impressed through the conductors 80. The second pulse again charges the capacitor 715 in the control circuit of the first thyratron 635 rendering the latter conductive at the instant predetermined by the setting of its associated rheostat 655. The associated ignitron 615 is now again rendered conductive further building up the current in the transformer 605. At an instant predetermined by the setting of the other rheostat 653, the second control thyratron 639 is rendered conductive and its associated ignitron 623 further conducts current through the second primary of the transformer. Now, the above-described process may again be repeated and current supplied to the welding transformer during another low frequency cycle. If it is repeated, the ignitron 623 will have become non-conductive before ignitron 615 fires.

The operation of the system shown in Figs. 3 and 3A is graphically illustrated in Fig. 4. In this view, current is plotted vertically and timed horizontally. As labeled the loops above the time axis correspond to the current conducted by the ignitrons 615 and 621; that is windings 607 and 609 from right to left; and the loops below the axis correspond to the current conducted by the ignitrons 617 and 623 through the windings 607 and 609 from left to right. Current begins to flow through the primary 607 approximately $1/12$ of a period of the supply after the beginning of the period during which the first pulse is impressed through the conductors 66. This current is indicated by the first loop flows between the instants $1/12$ and $5/12$ after the beginning of period. At the instant $5/12$ after the beginning of the period, the second ignitron 621 is rendered conductive and current flows through the winding 609 as represented by the second loop. This current flows until $13/12$ of a period after the beginning of the first period. At this point, current is again conducted through the first primary 607 for approximately $4/12$ of a period as represented by the third loop 615 and then current flows through the second primary 609 as represented by the fourth loop 621. The current conducted by the second ignitron now continues until just before the first ignitron 617 of the second group is rendered conductive. This current continues for somewhat less than one period of the supply as represented by the fourth loop 621. Thereafter, the current flow through the other ignitrons as represented by the corresponding loops 617, 623 below the time axis.

Although I have shown and described certain specific embodiments of my invention, I am fully aware that many modifications thereof are possible. My invention, therefore, is not to be restricted excepted insofar as is necessitated by the prior art and by the spirit of the appended claims.

I claim as my invention:

1. In combination $n$ power supply conductors adapted to be connected to an $n$ phase supply; a highly inductive reactive transformer having only $n-1$ primaries; $n-1$ circuits each directly between a different pair of said $n$ conductors and a different one of said primaries, each circuit including a pair of electric discharge paths each consisting of an anode and a cathode, the anodes and cathodes of each pair being connected in an anti-parallel network and means for connecting in series the primary of said circuit, said network of said circuit and the associated pair of the $n$ conductors; and connections for rendering conductive, periodically and in succession, first one of each of said pairs of paths for a predetermined time interval to conduct current of one polarity through said transformer and thereafter the other of each of said pairs of paths for a succeeding time interval to conduct current of the opposite polarity through said transformer during said succeeding interval.

2. In combination $n$ power supply conductors adapted to be connected to an $n$ phase supply; a highly inductive reactive transformer having only $n-1$ primaries; $n-1$ pairs of electric discharge paths, each path defined by an anode and a cathode, each pair associated with a different pair of said $n$ conductors; means for connecting directly in series each pair of conductors, a different one of said primaries and the anodes and cathodes of a different pair of electric discharge paths, said last-named anodes and cathodes being connected in anti-parallel; and connections for rendering conductive, periodically and in succession, first one of each of said pairs of paths for a predetermined time interval to conduct current of one polarity through said transformer and thereafter the other of each of said pairs of paths for a succeeding time interval equal in duration to said first-named time interval to conduct current of the opposite polarity through said transformer.

3. A system for supplying a load requiring periodic current pulses of one frequency from an $n$ phase supply of a higher frequency having $n$ phase conductors, said system including a plurality of electric discharge valve means, each of said valve means being adapted to be interposed between a different pair of said phase conductors and said load, and means for rendering said valve means conductive in such sequence relative to the load as to conduct said current of said one frequency; said system being characterized by the fact that said plurality of valve means equals only $n-1$ valve means and said valve means is adapted to be interposed directly only between $n-1$ pairs of phase conductors and said load thereby assuring timely termination of current flow at the end of each of said pulses.

4. A system for supplying a load requiring periodic current pulses of one frequency from an $n$ phase supply of a higher frequency having $n$ phase conductors, said system including pairs of electric discharge valves adapted to be interposed in anti-parallel between said phase conductors and said load, and means for rendering one valve of each said pair conductive in succession during predetermined discrete intervals to supply said current pulses of one polarity and the other valve of each said pair conductive in succession during predetermined intervals intervening between said first-named intervals to supply said current pulses of the opposite polarity; said system being characterized by the fact that there are only $n-1$ of said pairs of said valves and said pairs are adapted to be directly interposed only between $n-1$ pairs of phase conductors and said load thereby assuring timely termination of current flow at the end of each of said pulses.

5. Apparatus for supplying power to a highly inductive reactive transformer having only $n-1$ primaries from an $n$ phase supply, comprising in combination; $n-1$ pairs of electric discharge paths each consisting of an anode and a cathode, means for connecting the anodes and cathodes of each pair in anti-parallel directly between a different phase of said supply and said load; means for rendering one of the paths of each of said pairs conductive during successive pulsations of one polarity of said supply during a predetermined time interval and means for thereafter rendering the other path of each of said pairs conductive during successive pulsations of the opposite polarity during a second time interval following said first time interval and equal in duration to said first interval.

6. Apparatus for supplying power from a three-phase three-wire supply to a transformer having only a first primary winding means and second primary winding means comprising in combination a pair of electric discharge paths each consisting of an anode and a cathode associated with each of said winding means; means for connecting the anodes and cathodes of said paths of each said pair in an anti-parallel network; means for connecting said networks and said winding means in an open-delta circuit with each arm of said open-delta circuit including one of said winding means and a network of the pair of paths associated with said last-named winding means; and means for connecting the terminal of said open-delta circuit each to a different wire of said supply.

7. In combination in supply terminals adapted to be connected to an $n$-phase supply; a pair of discharge paths each consisting of an anode and a cathode associated with each one of $n-1$ of said supply terminals, means for connecting the anode of one path of each pair and the cathode of the other path of each pair directly to the associated supply terminal; first, second, third and fourth load terminals, current flowing through a load between said first and second terminals and between said third and fourth terminals, means connecting said first and third terminals respectively directly to the common junction of the remaining anode and cathode of each pair and means for connecting said second and fourth terminals respectively directly to different supply terminals than the one associated with the pair to which the first and third terminals respectively are connected.

8. In combinaion $n$-supply terminals adapted to be connected to an $n$-phase supply; a pair of discharge paths each consisting of an anode and a cathode associated with each one of $n-1$ of said supply terminals; means for connecting the anode of one path of each pair and the cathode of the other path of each pair directly to the associated supply terminal; first, second, third and fourth load terminals adapted to supply a load, current to flow through said load between said first and second and said third and fourth terminals, means connecting said first and third terminals respectively directly to the common junction of the remaining anode and cathode of each said pair, means connecting said second and fourth terminals respectively directly to a different supply terminal than the one associated with the pair to which said first and third terminals respectively are connected; and means for rendering conductive, periodically and in succession, first one path each of said pairs of paths for a predetermined time interval to conduct current of one polarity through said load and thereafter the other path each of said pairs of paths for a succeeding time interval to conduct current of the opposite polarity through said load.

References Cited in the file of this patent
UNITED STATES PATENTS

| | | |
|---|---|---|
| 2,236,984 | Alexanderson | Apr. 1, 1941 |
| 2,264,854 | Mittag | Dec. 2, 1941 |
| 2,600,519 | Solomon | June 17, 1952 |
| 2,607,907 | Marshall | Aug. 19, 1952 |
| 2,614,240 | Bivens | Oct. 14, 1952 |
| 2,625,651 | Schmidt | Jan. 13, 1953 |
| 2,721,302 | Bivens et al. | Oct. 18, 1955 |